(12) United States Patent
Digele et al.

(10) Patent No.: US 8,739,520 B2
(45) Date of Patent: Jun. 3, 2014

(54) AIR-COOLED EXHAUST GAS HEAT EXCHANGER, IN PARTICULAR EXHAUST GAS COOLER FOR MOTOR VEHICLES

(75) Inventors: Jörg Digele, Freiberg (DE); Peter Geskes, Ostfildfern (DE); Klaus Irmler, Ammerbuch (DE); Frank Von Lützau, Berglen (DE)

(73) Assignee: Behr GmbH & Co. KG, Stuttgart (DE)

( * ) Notice: Subject to any disclaimer, the term of this patent is extended or adjusted under 35 U.S.C. 154(b) by 1410 days.

(21) Appl. No.: 11/664,719

(22) PCT Filed: Oct. 5, 2005

(86) PCT No.: PCT/EP2005/010718
§ 371 (c)(1),
(2), (4) Date: May 4, 2007

(87) PCT Pub. No.: WO2006/040053
PCT Pub. Date: Apr. 20, 2006

(65) Prior Publication Data
US 2007/0261400 A1    Nov. 15, 2007

(30) Foreign Application Priority Data
Oct. 7, 2004   (DE) .......................... 10 2004 049 108
May 19, 2005   (DE) .......................... 10 2005 023 795

(51) Int. Cl.
*F01N 3/02*   (2006.01)
*F01N 3/00*   (2006.01)

(52) U.S. Cl.
USPC ............................................. 60/320; 60/298

(58) Field of Classification Search
USPC ............................................. 60/298, 299, 320
See application file for complete search history.

(56) References Cited

U.S. PATENT DOCUMENTS

| 4,271,110 A | * | 6/1981 | Minjolle ........................ 264/629 |
| 5,564,497 A | | 10/1996 | Fukuoka et al. |
| 5,987,885 A | | 11/1999 | Kizer et al. |
| 6,141,961 A | * | 11/2000 | Rinckel ............................ 60/288 |

(Continued)

FOREIGN PATENT DOCUMENTS

| CN | 1128344 A | 8/1996 |
| DE | 35 08 240 A1 | 9/1986 |

(Continued)

OTHER PUBLICATIONS

Office Action mailed Nov. 8, 2011 in related Japanese Application No. 2007-535080 (2 pgs.).

(Continued)

*Primary Examiner* — Thomas Denion
*Assistant Examiner* — Diem Tran
(74) *Attorney, Agent, or Firm* — Foley & Lardner LLP

(57) ABSTRACT

The invention relates to an air-cooled exhaust gas heat exchanger, in particular exhaust gas cooler (1) for motor vehicles comprising channels (exhaust gas channels) which can be cross-flown by the exhaust gas of an internal combustion engine, between which ribs (4) for air cooling are arranged. According to the invention, the exhaust gas channels are embodied as tubes, in particular as flat tubes (3), which form the ribs (4) of a rib tube block (2) and the tube (3) has tube ends (3a) which are received in the collecting vessels (5) for the exhaust gas.

57 Claims, 11 Drawing Sheets

(56) References Cited

U.S. PATENT DOCUMENTS

Figure 1:
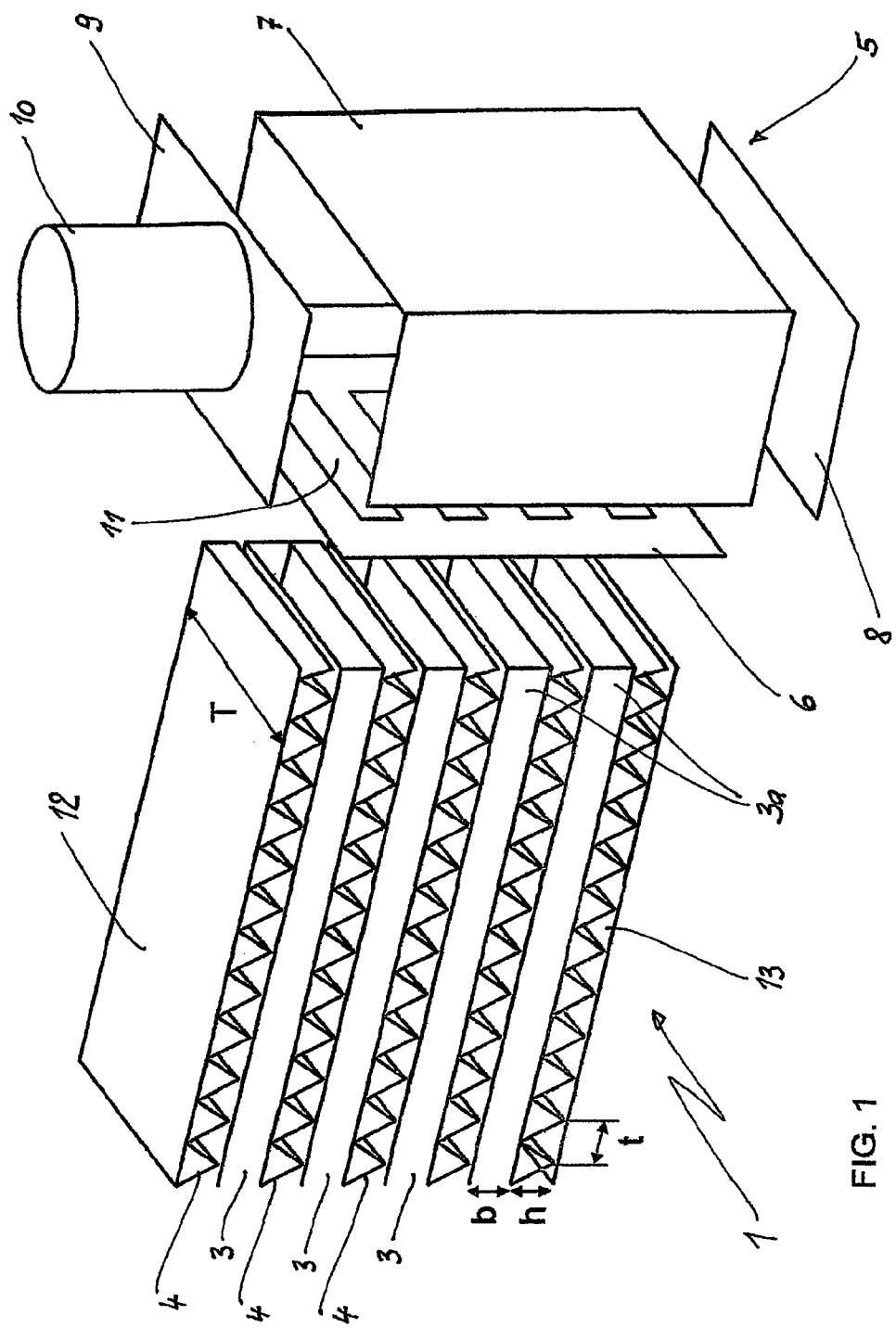

| | | | |
|---|---|---|---|
| 6,212,105 B1 | 4/2001 | Kowalski | |
| 6,223,812 B1 | 5/2001 | Gough | |
| 6,360,532 B2 | 3/2002 | Strähle et al. | |
| 6,374,911 B1 * | 4/2002 | Olson et al. | 165/173 |
| 6,464,854 B2 * | 10/2002 | Andrews et al. | 205/628 |
| 6,474,408 B1 * | 11/2002 | Yeh et al. | 165/82 |
| 6,786,210 B2 | 9/2004 | Kennedy et al. | |
| 6,832,475 B2 * | 12/2004 | Tanaka et al. | 60/298 |
| 7,011,080 B2 | 3/2006 | Kennedy | |
| 7,032,577 B2 | 4/2006 | Rosin et al. | |
| 7,059,308 B2 | 6/2006 | Eitel et al. | |
| 7,168,419 B2 | 1/2007 | Rosin et al. | |
| 7,171,956 B2 | 2/2007 | Igami et al. | |
| 7,210,468 B1 * | 5/2007 | Saele | 123/568.12 |
| 7,797,928 B2 * | 9/2010 | Friedrich et al. | 60/284 |
| 2003/0234009 A1 | 12/2003 | Kennedy et al. | |

FOREIGN PATENT DOCUMENTS

| | | |
|---|---|---|
| DE | 42 40 239 A1 | 6/1994 |
| DE | 195 14 016 C1 | 8/1996 |
| DE | 196 29 015 A1 | 1/1998 |
| DE | 199 07 163 A1 | 10/1999 |
| DE | 199 58 595 A1 | 8/2000 |
| DE | 100 11 954 A1 | 9/2001 |
| DE | 101 25 989 A1 | 11/2002 |
| DE | 101 40 988 A1 | 11/2002 |
| DE | 102 03 003 A1 | 8/2003 |
| DE | 103 27 847 A1 | 5/2004 |
| DE | 103 51 546 A1 | 6/2004 |
| EP | 0 677 715 A1 | 10/1995 |
| EP | 0 916 837 B1 | 5/1999 |
| EP | 1 031 708 B1 | 8/2000 |
| EP | 1 136 667 A2 | 9/2001 |
| EP | 1 391 677 A2 | 2/2004 |
| GB | 2 316 445 A | 2/1998 |
| JP | 5322475 A | 12/1993 |
| JP | 7139765 | 5/1995 |
| JP | 8009300 | 1/1996 |
| JP | 10-220305 A | 8/1998 |
| JP | 10-278544 | 10/1998 |
| JP | 2001027496 A | 1/2001 |
| JP | 2003286846 A | 10/2003 |
| JP | 2004-028469 | 1/2004 |
| JP | 2004028105 | 1/2004 |
| KR | 2003118230000 | 8/2003 |
| WO | WO 2004/020928 A1 | 3/2004 |

OTHER PUBLICATIONS

Office Action mailed Feb. 23, 2012 in related Korean application No. 2007-7009867 (7 pages) with English language translation (6 pages).

* cited by examiner

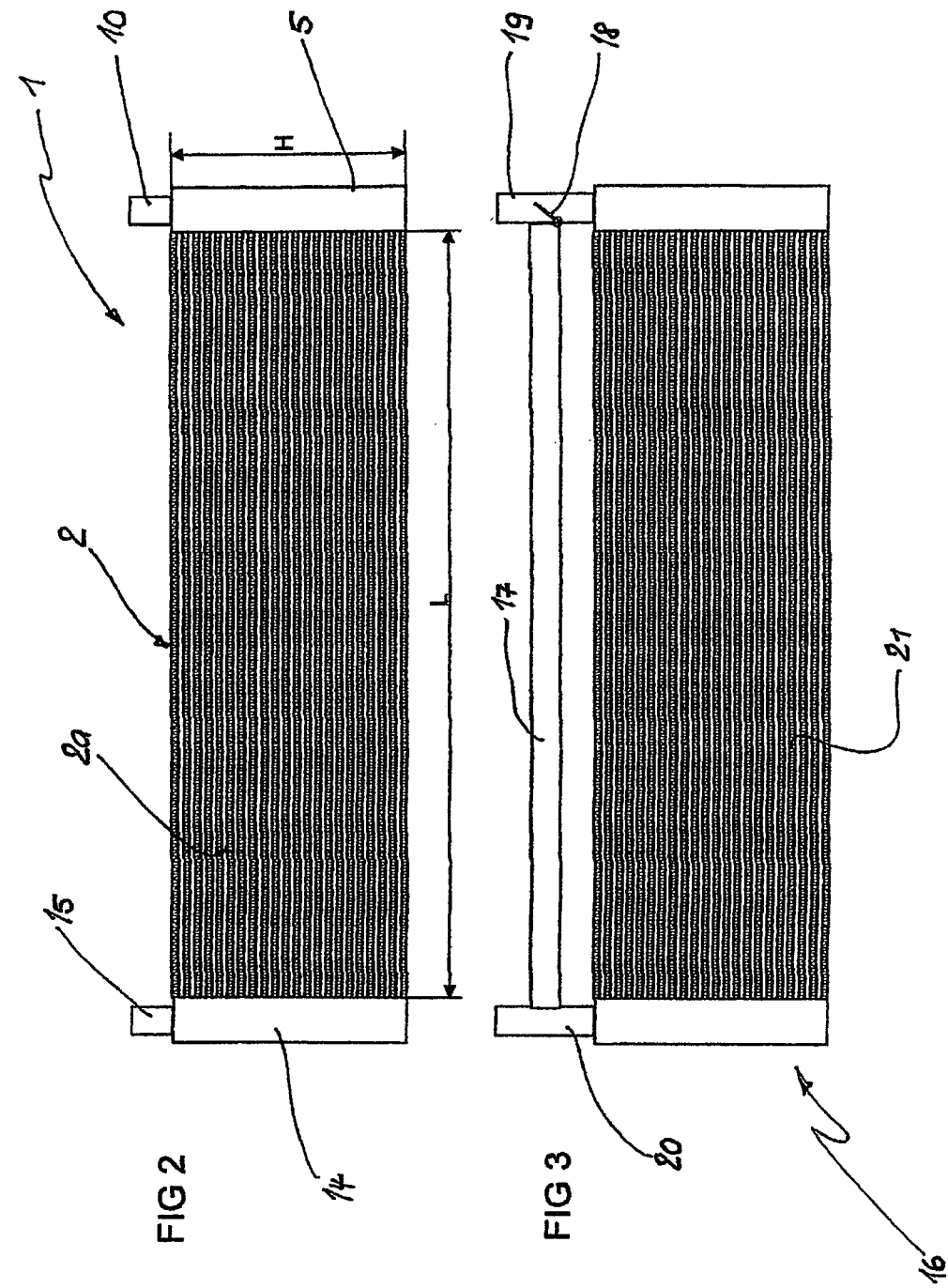

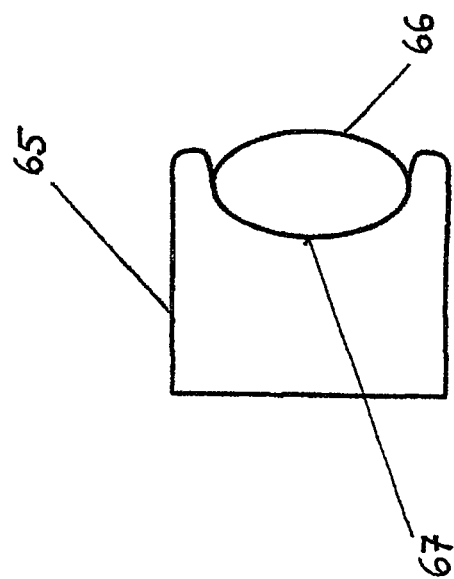
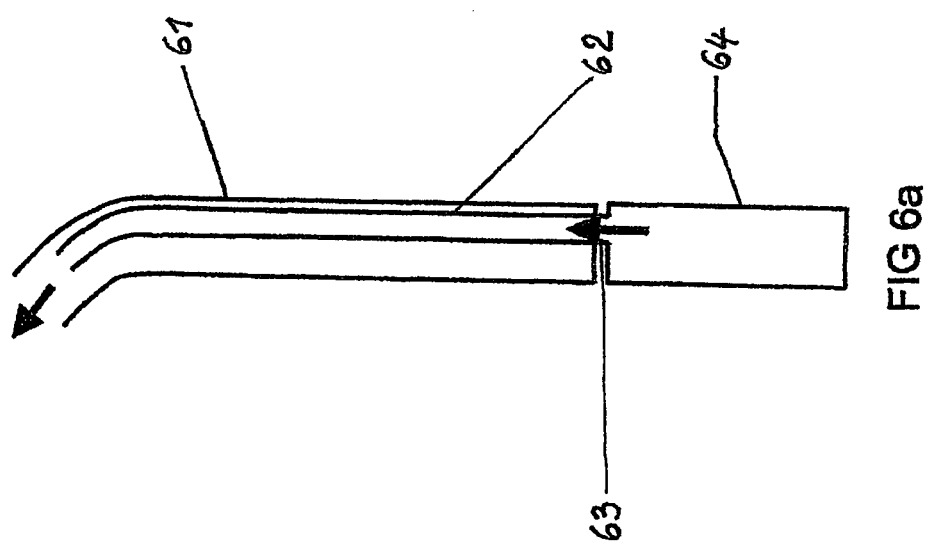

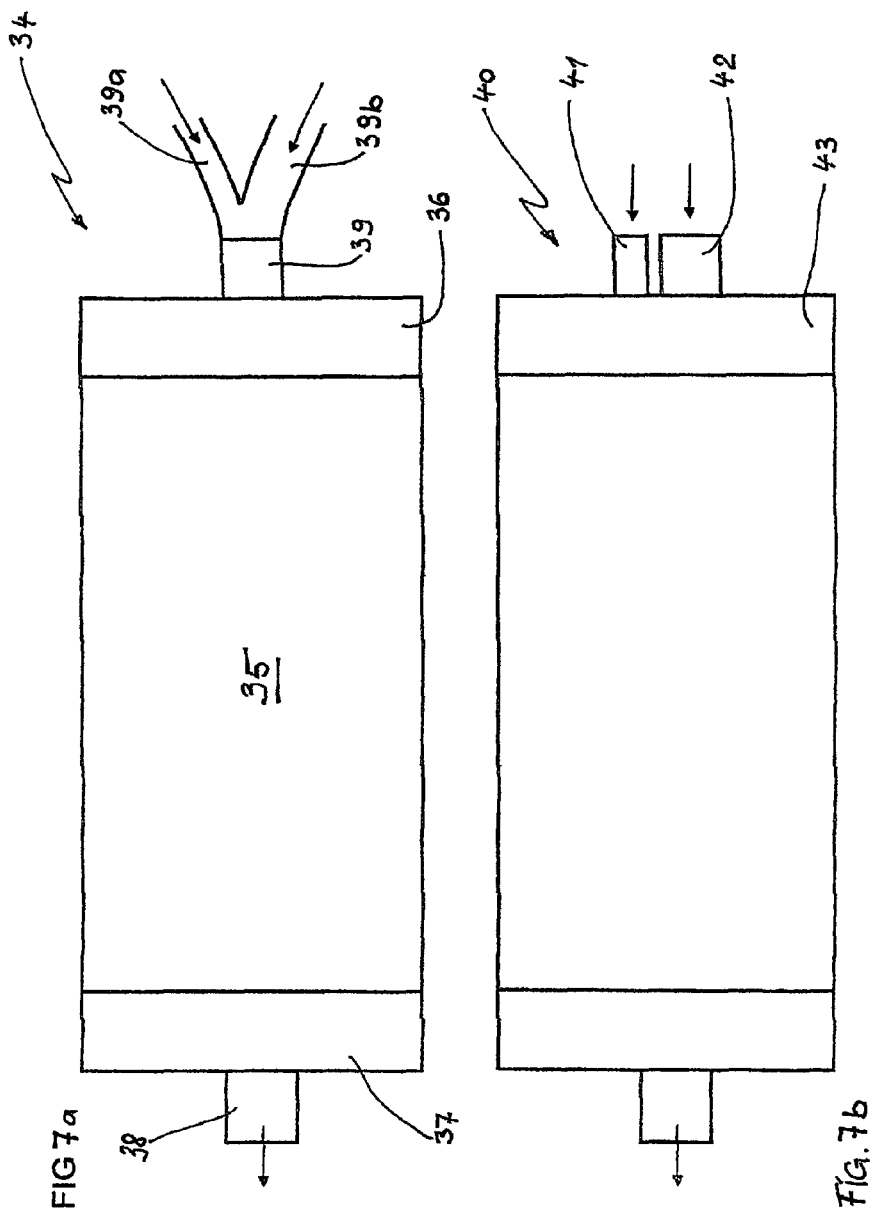

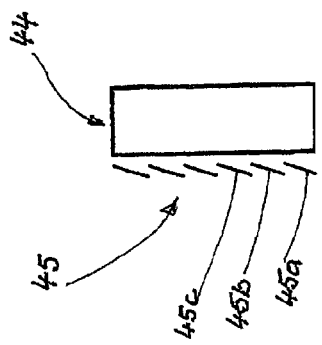
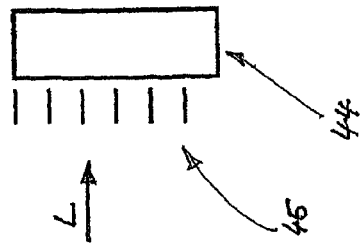
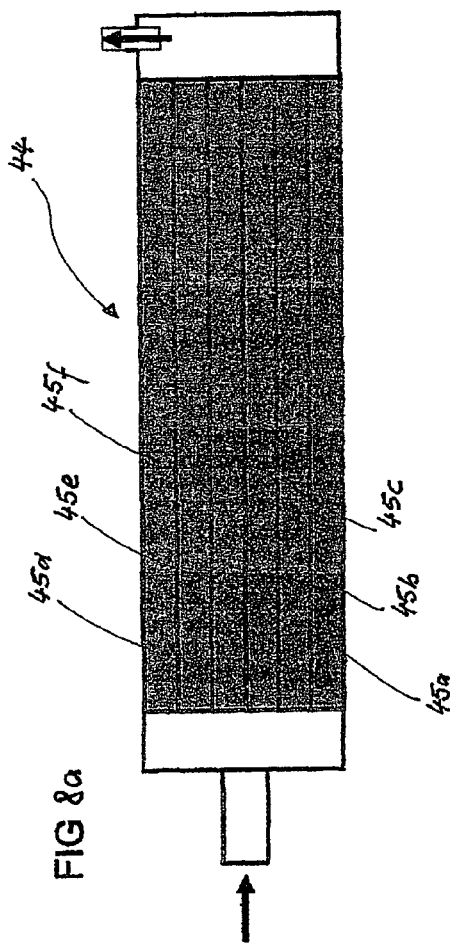
FIG 8a
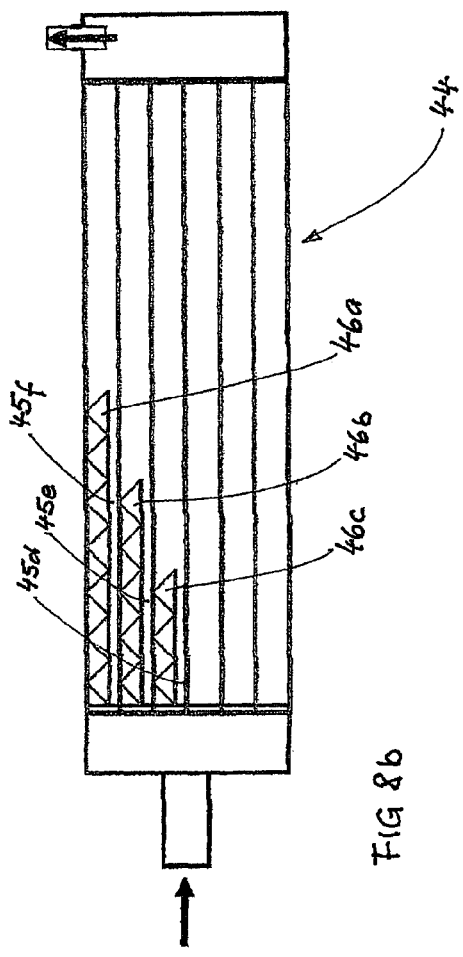
FIG 8b

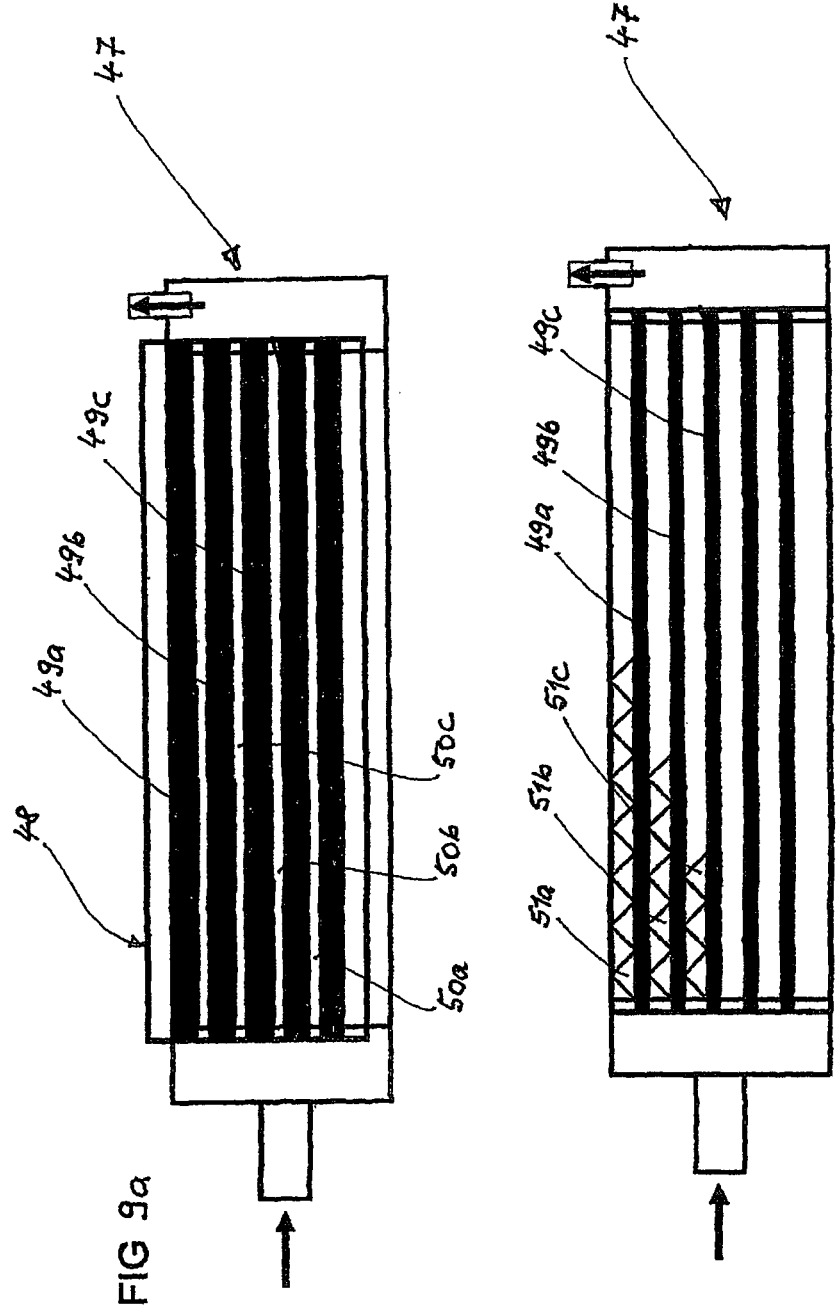

AIR-COOLED EXHAUST GAS HEAT EXCHANGER, IN PARTICULAR EXHAUST GAS COOLER FOR MOTOR VEHICLES

The invention relates to an air-cooled exhaust gas heat exchanger, in particular an exhaust gas cooler for motor vehicles, as claimed in the preamble of patent claim 1, and an arrangement for exhaust gas recirculation as claimed in the preamble of patent claim 37.

Exhaust gas coolers are used in modern-day vehicles, in particular utility vehicles, within the context of an exhaust gas recirculation system (EGR system) for cooling recirculated exhaust gases. Exhaust gas recirculation is based on legal regulations for reducing the fuel consumption of the internal combustion engine and for reducing the pollutants (in particular $NO_x$) in the exhaust gases of the internal combustion engine. The exhaust gas coolers previously used in motor vehicles are cooled by a liquid coolant which is extracted from the cooling circuit of the internal combustion engine. Said known liquid-cooled exhaust gas coolers operate very effectively but have the disadvantage that the cooling of the exhaust gases is tied to the coolant temperature which is in the range from 80 to 100° C. This only permits exhaust gas outlet temperatures downstream of the exhaust gas cooler of approximately 120 to 150° C.

DE 199 07 163 A1 from the applicant has disclosed a stainless steel exhaust gas heat exchanger which is composed of a tube bundle, which can be traversed by exhaust gases, and a housing which can be traversed by a liquid coolant. The exhaust gas tubes are welded into tube plates which in turn are welded to the housing. All the weld seams are preferably produced by means of laser welding methods.

DE 102 03 003 A1 from the applicant has disclosed an exhaust gas heat exchanger having an integrated bypass and an integrated bypass flap which permits a bypass of the exhaust gas heat exchanger if cooling of the exhaust gases is not necessary.

EP 0 677 715 A1 from the applicant has disclosed various embodiments for exhaust gas coolers for motor vehicles, with one embodiment disclosing an air-cooled exhaust gas cooler which is constructed as a plate heat exchanger, between which are arranged corrugated fins for air cooling. The plates which form the exhaust gas ducts are composed in each case of two plate halves which are soldered to one another at the periphery and are connected to one another by means of inlet and outlet openings which can be stacked one on top of the other. Arranged in the exhaust gas ducts or plates are so-called winglets, that is to say lobes or fins which are arranged in a V-shape, generate turbulence of the exhaust gas flow and prevent soot deposition.

EP 916 837 B1 from the applicant has disclosed a liquid-cooled exhaust gas cooler having an integrated exhaust gas recirculation (EGR) valve which determines the quantity of the recirculated exhaust gas—a separate EGR valve in the EGR line is therefore dispensed with.

Proceeding from said prior art, in particular an air-cooled exhaust gas heat exchanger, it is an object of the present invention to improve an exhaust gas heat exchanger of the type specified in the introduction with regard to its design and the associated installation possibilities in the motor vehicle. It is also an object of the invention to improve an arrangement for exhaust gas recirculation in such a way as to permit a more intense reduction of the exhaust gas temperature. In addition, freezing of condensate in the exhaust gas heat exchanger is to be avoided.

Said object is achieved by means of the features of patent claim 1. It is provided according to the invention that the exhaust gas heat exchanger has, on the one hand, a fin/tube block, that is to say a block which is constructed from tubes for the exhaust gas and fins for the air cooling, and on the other hand, collecting tanks into which the exhaust gas tubes open out. The collecting tanks are preferably welded or soldered and have tube plates into which the tube ends of the exhaust gas tubes are soldered or welded, preferably laser-welded. Stainless steel is used as a preferred material for the exhaust gas tubes and the collecting tanks. Corrugated fins made from stainless steel or else from a non-ferrous metal can be used for the fin structure on the outside of the exhaust gas tubes. In order to increase the heat transfer on the air side, the fins, in particular corrugated fins, have gills which are cut into the fin material using known manufacturing methods. So-called webbed fins, as are known in particular in air-cooled charge air coolers, can also be used instead of corrugated fins. Gilled corrugated fins, in contrast, are known in particular from coolant coolers. Said air-cooled design of the exhaust gas cooler according to the invention achieves the advantage that it is possible to provide cooling of the recirculated exhaust gas to lower temperatures than by means of coolant cooling (liquid cooling), which increases the power of the internal combustion engine. In addition, the design according to the invention makes it possible to combine the exhaust gas cooler together with further air-cooled heat exchangers to form a modular unit, a so-called cooling module, composed of a coolant cooler, a charge air cooler and/or condenser. The exhaust gas cooler according to the invention can advantageously be arranged upstream of the coolant cooler or condenser, with said exhaust gas cooler only taking up a part of the end face. The remaining part of the end face can be covered by a charge air cooler. This results in an extremely compact design for a cooling module.

According to a further advantageous embodiment of the invention, the collecting tanks of the exhaust gas heat exchanger can be produced from plastic, with the plastic tanks being connected to a metallic tube plate mechanically, that is to say by means of a flanged connection and an inserted seal. The use of plastic has the advantage of a relatively low susceptibility to corrosion with respect to the exhaust gas. The plastic material is selected in such a way that it also withstands the mechanical loading as a result of the pressure and temperature of the exhaust gas. The metallic heat exchanger block, composed of tubes, fins and tube plates is produced separately by means of soldering or welding. The plastic tanks are placed on thereafter.

Further advantageous embodiments can be gathered from the further subclaims which contain dimensional specifications or dimensional ranges for the dimensioning of the fin height, the tube height, the ratio of tube height to fin height, the fin density and the hydraulic diameter of the tubes. Said dimensional specifications result in a heat exchanger which is optimized for the media of exhaust gas and air.

In a further advantageous embodiment of the invention, the exhaust gas cooler has a bypass duct which is preferably controlled by means of a bypass flap. This achieves the advantage that freezing of the cooler with condensate at low external temperatures is avoided; in addition, quicker warm-up of the engine is also obtained.

In a further advantageous embodiment of the invention, the exhaust gas heat exchanger is assigned a bypass duct without a bypass flap, with the flow through the bypass duct being controlled by means of the different pressure drops in the bypass duct and in the exhaust gas heat exchanger. The bypass duct is designed such that, at external temperatures which are above the freezing point, its pressure drop is lower than that of the exhaust gas heat exchanger, which can for example be provided by means of an aperture in the inlet region of the bypass duct. In the case of frozen exhaust gas ducts, the pressure drop in the exhaust gas heat exchanger is greater than that of the bypass duct, so that flow passes through said bypass duct. This achieves the advantage that, when the exhaust gas cooler is frozen, exhaust gas can be recirculated. A bypass flap with its inherent problems is dispensed with.

In a further embodiment of the invention, the exhaust gas heat exchanger is assigned a bypass which is opened or closed by means of a differential-pressure-controlled valve. If the pressure drop in the exhaust gas heat exchanger increases as a result of freezing of condensate in the exhaust gas ducts, the differential pressure also increases, which opens the valve closing member and therefore opens the bypass between the exhaust gas supply and recirculation lines. This also achieves the advantage that the exhaust gas cooler can be bypassed in the event of freezing and exhaust gas recirculation can be maintained. It is also possible for the valve closing member to be controlled externally.

In a further advantageous embodiment of the invention, in order to heat the exhaust gas heat exchanger, in particular its exhaust gas ducts, coolant ducts, in particular bypass ducts are provided which transport heat to the exhaust gas ducts which are at risk of freezing of condensate. This achieves the advantage that freezing of condensate in the exhaust gas heat exchanger is prevented.

In a further advantageous embodiment of the invention, the exhaust gas heat exchanger is assigned an electric heater which heats the exhaust gas ducts and thereby likewise prevents freezing.

In an advantageous refinement of the invention, a louver, in particular a flap-type louver, is arranged upstream of the fin/tube block. This likewise achieves the advantage that freezing of the exhaust gas cooler with condensate at very low temperatures is avoided and a quicker warm-up of the engine is ensured.

In a further advantageous embodiment of the invention, a displaceable covering device is arranged in the air flow direction upstream of the exhaust gas heat exchanger, which covering device can cover the cooling air ducts arranged between the exhaust gas ducts and can thereby prevent cooling. This achieves the advantage that freezing of condensate in the exhaust gas ducts is prevented and the exhaust gas recirculation is maintained. The covering device can preferably be actuated by means of a thermostat, for example an expansion element.

In a further advantageous embodiment of the invention, the exhaust gas cooler and the charge air cooler are connected to one another to form a module, with the gas flowing out being conducted in a separate exhaust gas duct through the outlet tank of the charge air cooler. Installation space can be saved in this way. The separation of exhaust gas and charge air in the outlet tank of the charge air cooler is necessary in order to avoid corrosion of the exhaust gas condensate with the charge air cooler which is normally composed of aluminum. The duct can be produced by inserting a thick aluminum wall (partition) into the outlet tank of the charge air cooler, which partition, as a result of its thickness, withstands the corrosive action of acidic exhaust gas condensate for a long period. It is alternatively also conceivable to insert a plastic or stainless steel duct, through which the exhaust gas flows, into the outlet tank of the charge air cooler. Said duct can also be attached externally (as an additional part) to the outlet tank of the charge air cooler or in a bulged portion of the outlet tank. It is advantageous if the charge air and exhaust gas are not mixed until a point which is sufficiently far downstream from the charge air cooler that no condensate can flow back into the charge air cooler. The mixing point of charge air and exhaust gas can also be designed in the form of a venturi nozzle or a similar device, so that the exhaust gas is partially sucked out of the exhaust gas cooler. The exhaust gas mass flow rate can be further increased in this way.

In a further advantageous embodiment of the invention, the exhaust gas cooler and a charge air cooler are integrated to form a common cooler, that is to say with common collecting tanks and with a common fin/tube block, whose tubes are traversed both by exhaust gas and by charge air or by a mixture of exhaust gases and charge air. Exhaust gas and charge air can be supplied either via a common inlet connecting piece, which has the advantage of a mixture of both gas flows, or via separate inlet connecting pieces. Said common heat exchanger results in cost and weight advantages in relation to two separate heat exchangers. There is additionally the resulting advantage that the cooler, which is preferably made from stainless steel on account of the hot and corrosive exhaust gases, also withstands relatively high charge air pressures. Present engine development is proceeding in this direction, that is to say tends toward higher levels of charging, which cannot always be controlled with present charge air coolers made from aluminum.

According to a further advantageous embodiment of the invention, an oxidation catalytic converter is connected upstream of the exhaust gas heat exchanger. This has the advantage that soot depositions in tubes which conduct exhaust gas are reduced. The oxidation catalytic converter can also advantageously be arranged in an inlet-side collecting tank.

The object of the invention is also achieved by means of an arrangement for an EGR system in which a conventional liquid-cooled exhaust gas cooler is connected upstream of the air-cooled exhaust gas cooler according to the invention. This provides two-stage cooling of the exhaust gas during the exhaust gas recirculation, so that the inlet temperatures for the air-cooled exhaust gas cooler can be reduced. This also results in an alignment of the exhaust gas and charge air temperatures, which is advantageous in particular if using a common heat exchanger for exhaust gas and charge air. As a result of the two-stage exhaust gas cooling, the exhaust gas reaches a lower temperature as it is recirculated into the intake tract of the internal combustion engine, which increases the volumetric efficiency of the cylinder and therefore the power of the engine.

Figure 4:
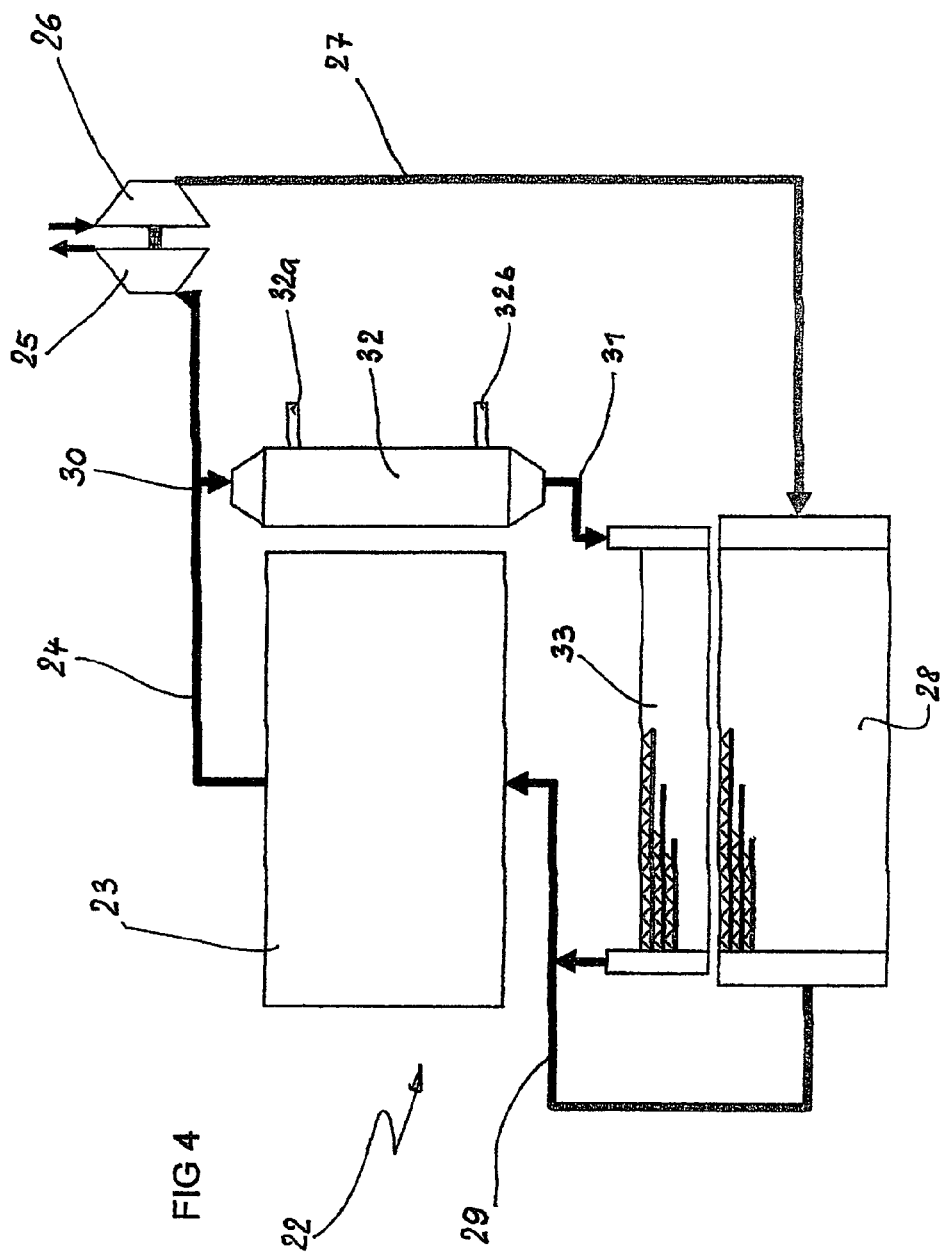
Figure 5:
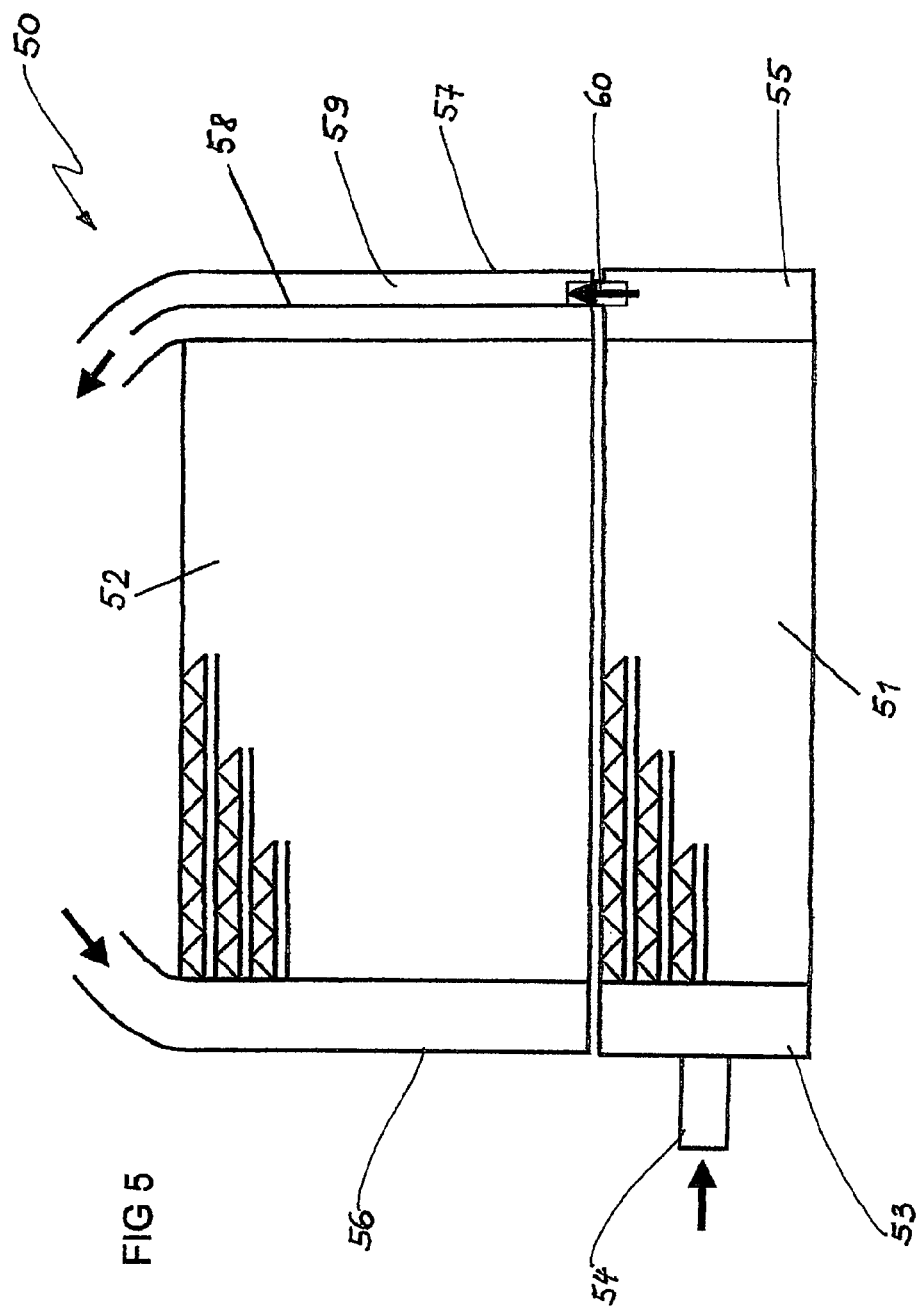
Figure 10:
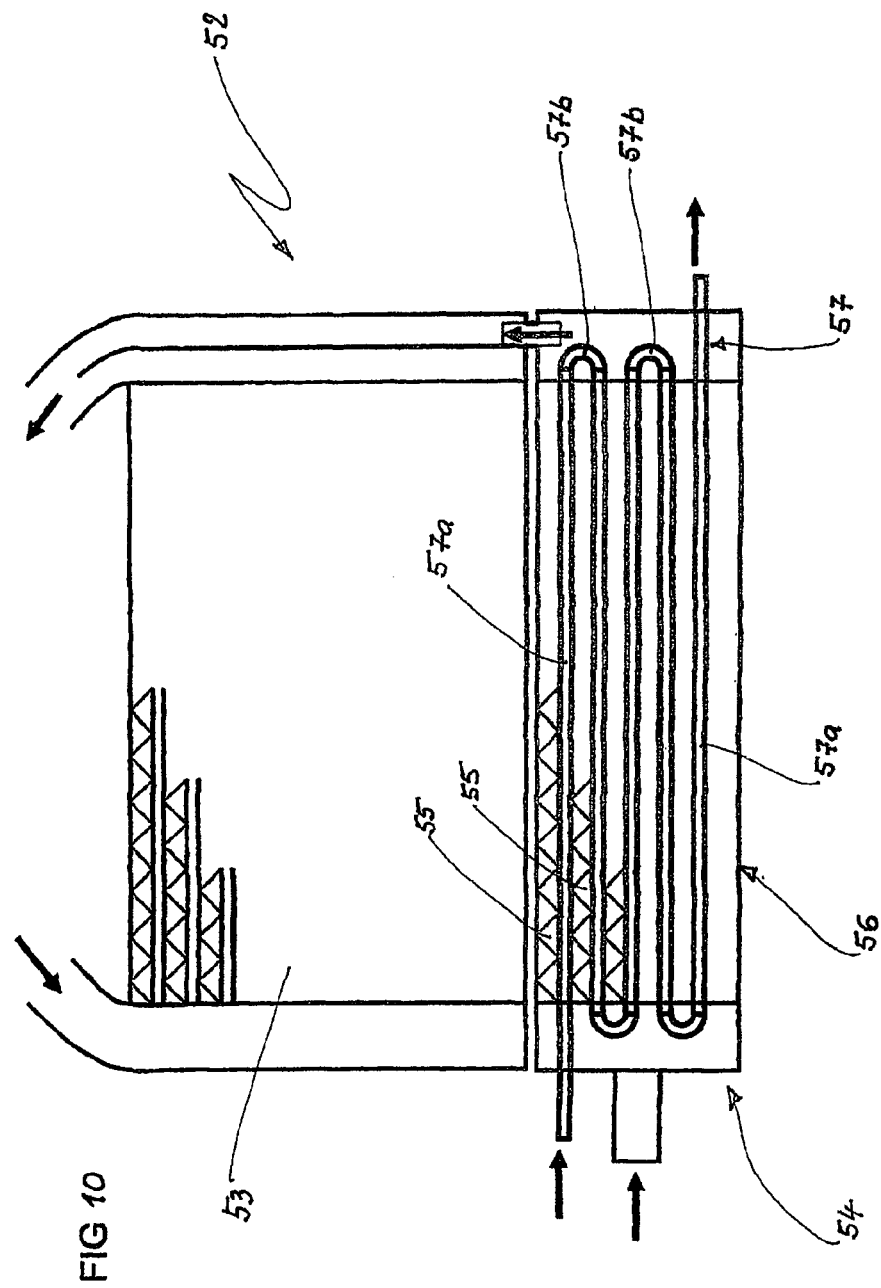
Figure 11:
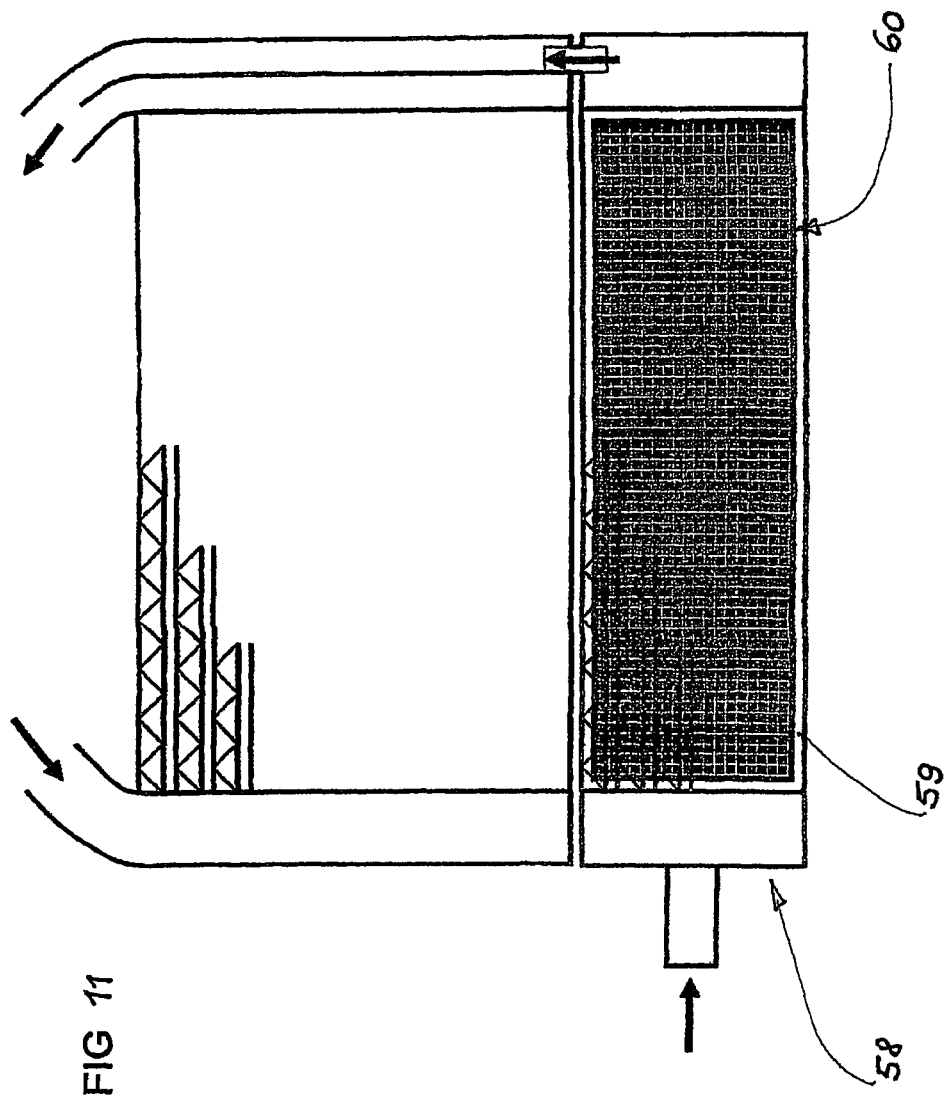
Figure 12:
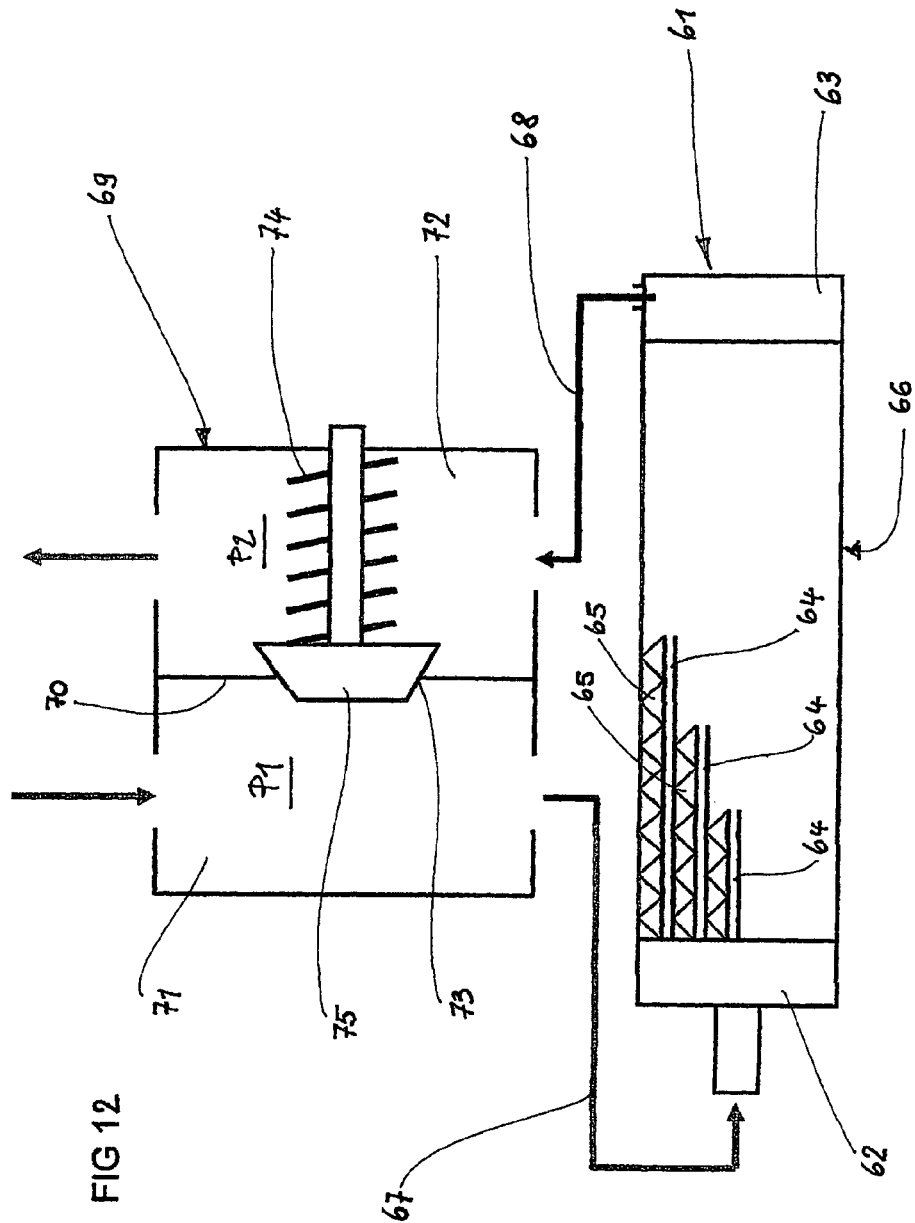

Exemplary embodiments of the invention are illustrated in the drawing and are described in more detail in the following. In the drawing:

FIG. 1 shows an air-cooled exhaust gas cooler according to the invention in an exploded illustration, FIG. 2 shows the exhaust gas cooler according to the invention in one view, FIG. 3 shows a refinement of the exhaust gas cooler according to the invention, having a bypass duct, FIG. 4 shows an EGR system having two-stage exhaust gas cooling by means of liquid-cooled and air-cooled exhaust gas heat exchangers, FIG. 5 shows a heat exchanger module composed of exhaust gas and charge air coolers, with a first design of a separate exhaust gas duct, FIG. 6a shows a second embodiment of the separate exhaust gas duct in the outlet tank of the charge air cooler, FIG. 6b shows a third embodiment of a separate exhaust gas duct on the outside of the outlet tank of the charge air cooler, FIG. 7a shows a first embodiment of a combined exhaust gas and charge air cooler, FIG. 7b shows a second embodiment of the combined exhaust gas and charge air cooler, FIG. 8a shows an exhaust gas cooler with a louver closed, FIG. 8b shows an exhaust gas cooler with a louver open, FIG. 9a shows an exhaust gas cooler with a displaceable covering device closed, FIG. 9b shows an exhaust gas cooler with the displaceable covering device open, FIG. 10 shows an exhaust gas cooler having a coolant bypass duct, FIG. 11 shows an exhaust gas cooler having an electric heater and FIG. 12 shows an exhaust gas cooler having a bypass valve.

FIG. 1 shows an exhaust gas cooler 1 according to the invention in an exploded illustration, that is to say separated into individual parts or modular units. The exhaust gas cooler 1 serves for cooling exhaust gases for an exhaust gas recirculation device in internal combustion engines of motor vehicles, which will be explained in more detail below on the basis of FIG. 4. The exhaust gas cooler 1 according to the invention has a fin/tube block 2 which is composed of flat tubes 3 and corrugated fins 4 arranged in between said flat tubes 3. The corrugated fins 4 are soldered or else welded to the flat tubes and thereby form a compact block 2. The corrugated fins 4 are traversed by ambient air and, in order to increase the heat transfer with respect to the air, have gills (not illustrated) as are for example known for corrugated fins in coolant coolers. As an alternative to the corrugated fins 4, it is also possible to use so-called webbed fins (not illustrated), that is to say fins of meandering design with flanks which are arranged offset. The webbed fins generally have a lower heat transfer power. The tubes 3 are traversed by exhaust gas and have winglets (not illustrated) as are known from the prior art cited in the introduction. Said winglets can, for example, be formed into the flat sides of the flat tubes 4, for example by means of massive forming. This provides improved heat transfer, and soot depositions are avoided. Alternatively, internal fins (not illustrated) can also be arranged in and soldered into the tubes. The exhaust gas cooler 1 according to the invention also has at least one collecting tank 5 which is composed, in a materially joined fashion, of a plate 6, a cover 7, an end wall 8 and a further end wall 9 with a connecting piece 10. Said parts—like the exhaust gas tubes 3 and the corrugated fins 4—are preferably composed of stainless steel. Rectangular openings 11 which correspond to the cross section of the flat tubes 3 are provided in the plate 6. The tube ends 3a are inserted into the openings 11 of the tube plate 11 and are welded to the tube plate 6, preferably by means of laser welding. This results in a sealed and fixed tube plate connection. A further collecting tank (not illustrated) is provided on the other side of the fin/tube block 2, so that all the exhaust gas tubes 3 are traversed by flow in parallel and in the same direction. Ambient air and exhaust gas flow thereby form a cross flow. The fin/tube block 2 is closed off at the top and at the bottom by side parts 12, 13 which are soldered to the outermost fin layers. The depth of the fin/tube block 2 in the air flow direction is denoted by T. The height of the corrugated fins 4 is denoted by h, the height of the flat tubes 3 is denoted by b and the pitch of the corrugated fins 4 is denoted by t. The pitch t is the reciprocal value of the fin density: the greater the pitch t, the lower the fin density, which is defined as the number of fins per dm. In the illustrated exemplary embodiment, the fin/tube block 2 is of single-row design; it can however also be advantageous for the fin/tube block to be of two-row or multi-row design, that is to say with shorter tubes in the air flow direction (in the depth direction T). This results in a higher internal pressure resistance for the exhaust gas tubes.

According to one preferred exemplary embodiment of the invention, the following dimensional ranges are provided for the optimum dimensioning of the exhaust gas cooler 1 or of the fin/tube block 2: the fin height h is in a range from 2 to 10 mm, preferably in a range from 4 to 6 mm, and is in particular 5 mm. The tube height b is in the range from 2 to 5 mm, preferably in the range from 3 to 10 mm, and is in particular 4.5 mm. The ratio of tube height b to fin height h is in the range from 0.5 to 1.5. The fin density is in the range from 20 to 80 fins/dm, preferably in the range from 30 to 50 fins/dm, and is in particular 35 fins/dm. The tubes have a hydraulic diameter which, by definition, is four times the ratio of the flow cross section to the wetted periphery. The hydraulic diameter of the tubes is in the range from 2 to 20 mm, preferably in the range from 3 to 10 mm. The depth T of the fin/tube block 2 is in the range from 20 to 100 mm, preferably in the range from 30 to 70 mm.

FIG. 2 shows the exhaust gas cooler 1 according to the invention in one view, with the same reference symbols being used for identical parts. The fin/tube block 2 is illustrated in one view, that is to say with its end face 2a which has a length L and a height H. Arranged at each side of the fin/tube block 2 are collecting tanks 5, 14, in each case with the exhaust gas connecting piece 10 and an exhaust gas connecting piece 15 which function in each case as inlet or outlet connecting pieces for the exhaust gas. The tubes of the fin/tube block 2 are thereby traversed by flow parallel to one another—horizontally in the drawing. A throughflow other than that illustrated is of course also possible, for example a U-shaped deflection in one collecting tank.

According to one preferred exemplary embodiment of the invention, the ratio of height H to length L is in a range from 0.1 to 0.8, preferably in the range from 0.2 to 0.4. The cooler is therefore relatively elongate and can therefore be matched with regard to its longitudinal extent to the length of a cooling module or of a coolant cooler. Here, a charge air cooler is advantageously arranged above the exhaust gas cooler, which charge air cooler at least partially covers the remaining part of the end face.

Not illustrated in the drawing is a condensate discharge which is arranged on the exhaust gas outlet side of the exhaust gas cooler, with the condensate being discharged either directly out or into the exhaust gas line (exhaust pipe).

Likewise not illustrated in the drawing is an exhaust gas recirculation valve, a so-called EGR valve, which can be arranged either in the inlet region or in the outlet region, that is to say in the region of the exhaust gas connecting pieces 10, 15. The EGR valve controls the branched-off, recirculated exhaust gas quantity. The arrangement of the EGR valve in the exhaust gas outlet region has the advantage that lower exhaust gas temperatures prevail there than at the inlet—as a result, the EGR valve could also be produced from plastic.

FIG. 3 shows a modified exemplary embodiment of the invention, specifically an exhaust gas cooler 16 having a bypass duct 17 and a bypass flap 18, with the bypass duct 17 extending between an inlet connecting piece 19 and an outlet connecting piece 20 parallel to the fin/tube block 21. By means of the bypass flap 18, the entire exhaust gas flow can be deflected through the bypass duct 17, so that cooling of the exhaust gases does not take place. This can be advantageous, for example, in a cold internal combustion engine during the warm-up phase.

FIG. 4 shows an arrangement of components of an exhaust gas recirculation system, of a so-called EGR system 22 for motor vehicles. An internal combustion engine, a diesel engine 23, has an exhaust gas line 24 which leads to an exhaust gas turbine 25 which drives a compressor 26. A charge air line 27 leads from the turbo compressor 26 to a charge air cooler 28 and subsequently via an intake line 29 to the engine 23. The charge air cooler 8 is air-cooled and cools the air, which is heated and compressed to charge pressure in the compressor 26, to a lower temperature level, in order to increase the volumetric efficiency for the cylinders of the engine. Provided in the exhaust gas line 24, that is to say between the engine 23 and the turbine 25, is a branching point 30 from which an exhaust gas recirculation line 31 branches off and leads to the intake region of the engine 23. A first exhaust gas cooler 32 is arranged in the EGR line 31, which exhaust gas cooler 32 is liquid-cooled and is connected by means of connections 32a, 32b to a coolant circuit (not illustrated) of the engine 23. Arranged downstream of the first exhaust gas cooler 32 in the exhaust gas flow direction is a second exhaust gas cooler 33 which is embodied as an air-cooled exhaust gas cooler according to the invention. The exhaust gases which are cooled in the second exhaust gas cooler 32 are supplied to the intake line 29, that is to say are mixed with the cooled charge air. The exhaust gases recirculated by means of the EGR line 31 are therefore cooled in two stages, with cooling to approximately 120 to 150° C. being provided in the first stage through the exhaust gas cooler 32. In the second stage through the second exhaust gas cooler 33, further cooling of the exhaust gases is provided to a temperature which is 5 to 50° C. above the ambient temperature.

In the drawing, the air-cooled exhaust gas cooler 33 and the charge air cooler 28 are arranged one above the other. This approximately also corresponds to the actual arrangement in the engine bay, where the two coolers 28, 33 are arranged in the air flow direction upstream of a cooling module (not illustrated) composed of a coolant cooler and a condenser. All the heat exchangers, that is to say the coolant cooler, condenser, charge air cooler and the air-cooled exhaust gas cooler according to the invention can therefore be combined compactly to form a modular unit, the so-called cooling module, and arranged and fastened in the forward engine bay of the motor vehicle. This ensures sufficient exposure to ambient air.

It is however also possible for the air-cooled exhaust gas cooler according to the invention to be arranged at a point in the engine bay other than at the cooling module, and to be assigned a separate fan if appropriate.

FIG. 5 shows a heat exchanger module 50 which is composed of an exhaust gas cooler 51 arranged—in the drawing—at the bottom and a charge air cooler arranged—in the drawing—above said exhaust gas cooler 51, with the two heat exchangers 51, 52 being impinged on with ambient air in parallel. The exhaust gas cooler 51 has an inlet-side tank 53, with an exhaust gas inlet connecting piece 54, and an outlet-side tank 55. The two exhaust gas tanks 53, 55 are, for corrosion reasons, preferably produced from plastic, that is to say are composed of a plastic tank which is connected by means of a mechanical connection (not illustrated) to a metallic tube plate (not illustrated in any more detail). The charge air cooler 52 has an inlet-side air tank 56 and an outlet-side air tank 57. The air tanks 56, 57 are preferably composed of an aluminum material which can be welded to the tube plates (not illustrated). A partition 58 is arranged in the outlet-side air tank 57, which partition forms a separate duct 59. The outlet-side exhaust gas tank 55 is connected by means of a connecting piece 60 to the exhaust gas duct 59, so that a flow connection is produced between the exhaust gas tank 55 and the duct 59. The exhaust gas thereby flows out of the outlet tank 55 into the separate duct 59 through the outlet-side air tank 57, with separation of exhaust gas and charge air being ensured. Exhaust gas and charge air are mixed with one another in a mixing zone (not illustrated) which is arranged at a sufficient distance downstream of the outlet tank 57. This avoids a return flow of exhaust gas condensate into the charge air cooler 52. The connecting piece 60 can be sealed off with respect to the air tank 57 using suitable seals. The exhaust gas cooler 51 and the charge air cooler 52 can be screwed to one another by means of flanges or brackets (not illustrated).

FIG. 6a shows a further exemplary embodiment for the design of an exhaust gas duct for a heat exchanger module as illustrated in FIG. 5. A separate exhaust gas duct 62, which can be produced from a corrosion-resistant material, in particular plastic or stainless steel, is arranged in the outlet tank 61 of the charge air cooler (not illustrated). The exhaust gas duct 62 is connected by means of a connecting piece 63 to the outlet tank 64 of the exhaust gas cooler (not illustrated). This solution therefore also ensures separation of the exhaust gas, which flows through the outlet tank 61 of the charge air cooler, from the charge air.

FIG. 6b shows a further exemplary embodiment for the arrangement and design of an exhaust gas duct, with merely the cross sections of the outlet tank 65 of the charge air cooler and of the exhaust gas duct 66 being illustrated here. The outlet tank 65 has, at its outer longitudinal side, a depression 67 which is matched to the oval cross section 66 of the exhaust gas duct, so that said exhaust gas duct 66 is embedded in the depression 67. The exhaust gas duct 66, which is fastened as an additional part to the outlet tank 65, can be produced from stainless steel, aluminum or plastic.

FIG. 7a shows, as a further exemplary embodiment of the invention, a combined heat exchanger 34 which constitutes an integration of the air-cooled exhaust gas cooler and the air-cooled charge air cooler (cf. FIG. 3: coolers 28, 33). The so-called combined cooler 34 has a fin/tube block 35, an inlet tank 36 and an outlet tank 37 with an outlet connecting piece 38. The inlet tank 36 has an inlet connecting piece 39 with a supply line 39a for the exhaust gas and a supply line 39b for the charge air. In the connecting piece 39, the exhaust gas flow and the charge air flow are therefore merged, pre-mixed and conducted into the inlet tank 36, where the entire flow is distributed to the tubes (not illustrated) of the fin/tube block 35. The combined cooler 34 is installed into the EGR system in a similar way as in FIG. 4, that is to say instead of the coolers 33, 28 shown in said figure. From the common outlet connecting piece 38, the cooled gas flow is supplied to the intake tract of the engine.

FIG. 7b shows a modified combined cooler 40 with a separate inlet connecting piece 41 for the exhaust gas and a separate inlet connecting piece 42 for the charge air. The two connecting pieces lead into a common collecting tank 43. The fin/tube block and the outlet tank correspond to the exemplary embodiment as per FIG. 7a. In the first exemplary embodiment, exhaust gas and charge air flow are already pre-mixed in the inlet connecting piece 39, which also causes a temperature alignment of the two gas flows. In the second exemplary embodiment with separate inlet connecting pieces 41, 42, the mixture of the two gas flows takes place substantially in the inlet tank 43.

FIGS. 8a and 8b show an exhaust gas heat exchanger 44 with a louver 45 arranged at the front side, which louver 45 is composed of individual pivotable flaps or lamellae 45a, 45b, 45c, . . . 45f. FIG. 8a shows the exhaust gas heat exchanger 44 with the louver 45 closed, that is to say the entire end face, which is impinged on at the air side, of the exhaust gas heat exchanger 44 is covered by the lamellae 45a to 45f. FIG. 8b shows the exhaust gas heat exchanger 44 with the louver 45 in the open position, that is to say the lamellae 45*a* to 45*f* are aligned parallel to the air flow direction L and thereby allow cooling air to pass through. Here, the lamellae 45*a* to 45*f* are arranged in each case in the air flow direction upstream of the exhaust gas ducts (not visible or not illustrated) of the exhaust gas heat exchanger 44, so that the fins 46*a*, 46*b*, 46*c*, . . . between the exhaust gas ducts are exposed for a throughflow of air. Cooling of the exhaust gas flowing through the exhaust gas heat exchanger 44 therefore takes place in the louver position in FIG. 8*b*, while in the closed louver position in FIG. 8, no cooling by means of an air flow takes place. The louver 45 is closed in particular at low ambient temperatures when there is the risk of freezing of condensate in the exhaust gas ducts. Freezing can thereby be largely avoided, and exhaust gas recirculation can be maintained.

FIGS. 9*a* and 9*b* show a further embodiment of the invention for an exhaust gas cooler 47 which can be shielded from the cooling air flow. Arranged in the air flow direction upstream of the exhaust gas cooler 47 is a displaceable covering device 48 which is composed of webs 49*a*, 49*b*, 49*c*, . . . and of longitudinal slots 50*a*, 50*b*, 50*c*, . . . which are arranged between the webs. The webs 49*a*, 49*b*, 49*c*, . . . can be moved by means of a suitable actuating motor transversely with respect to the longitudinal direction of the exhaust gas ducts (not illustrated), and can thereby partially expose or close off the end face of the exhaust gas cooler 47. FIG. 9*a* shows the exhaust gas cooler 47 with a covering device 48 closed, that is to say the webs 49*a*, 49*b*, 49*c*, . . . cover the cooling air ducts (not visible here), while the slots 50*a*, 50*b*, 50*c*, . . . are situated in the air flow direction upstream of the exhaust gas ducts. Air cooling therefore does not take place when the covering device 48 is closed. FIG. 9*b* shows the exhaust gas cooler 47 with the covering device 48 open, with the cooling air ducts, which are provided with fins 51*a*, 51*b*, 51*c*, . . . , between the exhaust gas ducts being exposed. The webs 49*a*, 49*b*, 49*c*, . . . are situated upstream of the exhaust gas ducts. The covering device 48 can be embodied as a grid structure (grid louver), with the individual grid bars being foldable or displaceable relative to one another, so that their end face which is impinged on with air flow can be increased or decreased in size. Said covering device 48 is also suitable for preventing freezing of condensate in the exhaust gas ducts and for maintaining exhaust gas recirculation. The covering device 48 can be actuated, that is to say moved transversely, by means of suitable actuating motors, for example temperature-dependent expanding elements, vacuum cells or other motors.

FIG. 10 shows a further exemplary embodiment of the invention having a so-called combined cooler 52 which is composed of a charge air cooler 53 and an exhaust gas cooler 54, which are both impinged on by cooling air. The exhaust gas cooler 54 has a block 56 which is composed of air fins 55 and exhaust gas ducts (not visible) and upstream of which—as viewed in the air flow direction—is arranged a serpentine-shaped coolant duct 57 which can be connected to a coolant circuit (not illustrated) of the internal combustion engine of the motor vehicle. The coolant duct 57 has straight sections 57*a* which are connected at the end side by means of tube curves 57*b*. The coolant duct 57, 57*a*, 57*b* thereby forms a tube coil, with the straight sections 57*a* being arranged upstream of the exhaust gas ducts (not visible) of the exhaust gas cooler 54, that is to say, the air fins 55 which form cooling air ducts are fully exposed to the cooling air flow. The straight sections 57*a* of the tube coil 57 are connected in a heat-transmitting fashion—be it by means of thermal conduction or by means of thermal radiation—to the exhaust gas ducts and thereby prevent freezing of condensate in the exhaust gas ducts, and therefore blockage, at low ambient temperatures. Exhaust gas recirculation can thereby be maintained even at low ambient temperatures as a result of the tube coil 57 which is traversed by coolant at a relatively high temperature. The coolant is preferably extracted from the engine return line, that is to say from the cooler supply line of the cooling circuit. The extraction of the hot coolant for the flow through the tube coil 57 can be controlled by means of a valve (not illustrated). The tube coil 57 preferably covers all of the exhaust gas ducts, but at least a part of the exhaust gas ducts.

FIG. 11 shows a further exemplary embodiment of the invention having an air-cooled exhaust gas cooler 58 which has an end face 59 which is impinged on by cooling air. Arranged in the air flow direction upstream of the end face 59 of the exhaust gas cooler 58 is an electrically heatable heating grid 60 composed of a plurality of heating filaments which are connected in a heat-transmitting fashion to the exhaust gas ducts (not visible) and air fins which are arranged in between said exhaust gas ducts. The electrically heatable heating grid 60 dissipates its heat—also via the air flow flowing through the heating grid 60—to the exhaust gas ducts and the air fins, so that these are heated at low ambient temperatures. Freezing of condensate in the exhaust gas cooler 58 can be prevented in this way. The heater can be switched on manually or automatically, for example as a function of the ambient temperature or of the exhaust gas outlet temperature downstream of the exhaust gas cooler 58.

FIG. 12 shows a further exemplary embodiment of the invention having an air-cooled exhaust gas cooler 61 which has an exhaust-gas-side inlet tank 62 and an exhaust-gas-side outlet tank 63, between which is arranged an exhaust gas block 66 composed of exhaust gas ducts 64 and cooling fins 65. The inlet tank 62 is connected to an exhaust gas supply line 67 and the outlet tank 63 is connected to an exhaust gas recirculation line 68. The exhaust gas cooler 61 is assigned a valve 69 which has two valve chambers 71, 72 which are separated by means of a partition 70. Arranged in the partition 70 is a valve opening 73 which is controlled by means of a valve closing member 75 which is loaded by means of a valve closing spring 74. The valve chamber 71 is traversed by the exhaust gas supply line 67, while the valve chamber 72 is traversed by the exhaust gas recirculation line 68. The valve opening 73 is closed by the valve closing member 75 for as long as the force of the valve closing spring 74 is greater than the pressure forces acting on the valve closing member 75. A pressure P1, which corresponds to the inlet-side exhaust gas pressure of the exhaust gas cooler 61, prevails in the valve chamber 71, while the pressure P2 in the valve chamber 72 corresponds to the outlet-side exhaust gas pressure of the exhaust gas cooler 61. A differential pressure $\Delta P$, which corresponds to the exhaust-gas-side pressure drop (P1 minus P2) in the exhaust gas cooler 61, therefore acts on the plate-shaped valve closing member 75. For as long as the exhaust gas tubes 64 are freely traversable, the exhaust gas heat exchanger 61 has a relatively low pressure drop $\Delta P = P1 - P2$. However, if partial or complete blockage of the exhaust gas tubes 64 occurs as a result of freezing of condensate at low ambient temperatures, then the exhaust-gas-side pressure drop in the exhaust gas cooler 61 increases and therefore the differential pressure acting on the valve closing member 75 rises: P2 becomes smaller, and P1 becomes larger, until the force resulting from the differential pressure becomes greater than the force of the closing spring 74—the valve closing member 75 then opens and opens the valve opening 73, which then acts as a bypass between the exhaust gas supply line 67 and the exhaust gas recirculation line 68. The exhaust gas cooler 61 is then completely or partially bypassed by means of the open bypass 73. This ensures that exhaust gas can be recirculated even at low ambient temperatures at which the frozen condensate in the exhaust gas cooler 61 blocks the tubes 64. In addition, external—electric or pneumatic—actuation of the valve 69 is also possible as a function of pressure or temperature.

A further exemplary embodiment of the invention (not illustrated in the drawing) relates to an air-cooled exhaust gas heat exchanger having a bypass duct for the exhaust gas, corresponding approximately to the exemplary embodiment as per FIG. 3, but without an exhaust gas bypass flap. This ensures that exhaust gas can be recirculated even at low ambient temperatures and if condensate is frozen in the cooler and the exhaust gas cooler is partially or completely closed off ("blocked") at the exhaust gas side. The bypass duct, in particular its inlet, is designed here in such a way that the pressure loss across the bypass duct is initially greater than the exhaust-gas-side pressure loss in the exhaust gas cooler (in the non-frozen state, that is to say with the maximum exhaust-gas-side throughflow cross section). In said state, the following relationship applies:

$$\Delta P_{By} > \Delta P_{Ak}$$

where $P_{By}$ is the pressure drop in the bypass and $P_{Ak}$ is the pressure drop in the exhaust gas cooler. If condensate freezes in the exhaust gas cooler, the pressure drop in the exhaust gas cooler rises until it reaches, and exceeds, the pressure loss in the bypass duct. Initially a partial mass flow rate, and in the event of complete blockage of the exhaust gas cooler, the entire exhaust gas mass flow rate, then flows through the bypass. The geometry and the dimensions of the bypass duct are configured in such a way that the condensate cannot freeze in the bypass duct; the bypass duct is preferably designed as a round tube or rectangular tube with a sufficient cross section as a function of the mass flow rates. An advantage of said bypass, which is controlled by means of the pressure loss itself, is that no bypass flap and also no further actuation of said flap are required.

The invention claimed is:

1. An air-cooled exhaust gas heat exchanger for a motor vehicle, the exhaust gas heat exchanger comprising:
   a plurality of flat exhaust gas tubes configured to allow a flow of exhaust gas therethrough;
   a plurality of ambient air ducts arranged between the flat exhaust gas tubes and configured to allow a flow of ambient air therethrough;
   first and second collecting tanks configured to receive ends of the flat exhaust gas tubes; and
   at least one coolant duct arranged upstream of the plurality of flat exhaust gas tubes in a direction of the flow of ambient air;
   wherein each of the ambient air ducts comprises a plurality of fins,
   wherein the plurality of flat exhaust gas tubes and the plurality of fins of the ambient air ducts form a fin/tube block, and
   wherein each of the flat exhaust gas tubes comprises a plurality of turbulence inserts, soldered-in internal fins, or winglets.

2. The exhaust gas heat exchanger as claimed in claim 1, wherein the flat exhaust gas tubes comprise steel.

3. The exhaust gas heat exchanger as claimed in claim 1, wherein the fins of the ambient air ducts comprise steel or a non-ferrous metal.

4. The exhaust gas heat exchanger as claimed in claim 1, wherein the fins of the ambient air ducts are corrugated fins and comprise gills.

5. The exhaust gas heat exchanger as claimed in claim 1, wherein the fins of the ambient air ducts are webbed fins.

6. The exhaust gas heat exchanger as claimed in claim 1, wherein the flat exhaust gas tubes are arranged in a plurality of rows.

7. The exhaust gas heat exchanger as claimed in claim 1, wherein the first and second collecting tanks for the exhaust gas comprise stainless steel or plastic.

8. The exhaust gas heat exchanger as claimed in claim 1, wherein the fins of the ambient air ducts have a fin density in a range from 20 to 80 fins/dm.

9. The exhaust gas heat exchanger as claimed in claim 1, wherein at least one of the plurality of flat exhaust gas tubes has a hydraulic diameter $d_h$ which is in a range of $2 \leq d_h \leq 20$.

10. The exhaust gas heat exchanger as claimed in claim 1, wherein the fin/tube block has a depth T, measured in a direction of the flow of ambient air, in a range of $20 \leq T \leq 100$ mm.

11. The exhaust gas heat exchanger as claimed in claim 1, wherein:
    the fin/tube block has a height H and the length L, and a ratio of height H to length L is in a range of $0.1 \leq H/L \leq 0.8$.

12. The exhaust gas heat exchanger as claimed in claim 1, further comprising a bypass duct for the exhaust gas.

13. The exhaust gas heat exchanger as claimed in claim 1, further comprising a bypass duct for the exhaust gas,
    wherein the exhaust gas heat exchanger has a pressure drop $\Delta P_{Ak}$ and the bypass duct has a pressure drop $\Delta P_{By}$,
    wherein the exhaust gas heat exchanger and the bypass duct are configured such that, when the exhaust gas heat exchanger is open, a relationship $\Delta P_{By} > \Delta P_{Ak}$ applies, and when the exhaust gas heat exchanger is partially or completely blocked, a relationship $\Delta P_{By} < \Delta P_{Ak}$ applies.

14. The exhaust gas heat exchanger as claimed in claim 1, further comprising a bypass configured to be controlled externally as a function of a through flow cross section of the exhaust gas heat exchanger.

15. The exhaust gas heat exchanger as claimed in claim 1, wherein a louver is arranged upstream of the exhaust gas heat exchanger in a direction of the flow of ambient air.

16. The exhaust gas heat exchanger as claimed in claim 1, further comprising a condensate discharge located on an exhaust gas outlet side.

17. The exhaust gas heat exchanger as claimed in claim 1, wherein the exhaust gas heat exchanger comprises an integrated EGR valve.

18. The exhaust gas heat exchanger as claimed in claim 1, wherein the at least one coolant duct has a serpentine shape and comprises straight duct sections which are arranged parallel to the flat exhaust gas tubes.

19. The exhaust gas heat exchanger as claimed in claim 1, wherein the coolant duct is connected to a cooling circuit of an internal combustion engine.

20. The exhaust gas heat exchanger as claimed in claim 1, wherein the fin/tube block comprises first and second side parts.

21. The exhaust gas heat exchanger as claimed in claim 20, wherein each of the first and second side parts comprises a further flat tube which cannot be traversed by flow and is connected to an outermost fin layer.

22. The exhaust gas heat exchanger as claimed in claim 1, wherein at least one of the plurality of fins of the ambient air ducts has a fin height h, wherein the following dimensional range applies:

$$2 \leq h \leq 10 \text{ mm}.$$

23. The exhaust gas heat exchanger as claimed in claim 22, wherein the fin height h=5 mm.

24. The exhaust gas heat exchanger as claimed in claim 1, wherein at least one of the plurality of flat exhaust gas tubes has a tube height b, wherein the following dimensional range applies:

$$2 \leq b \leq 10 \text{ mm.}$$

25. The exhaust gas heat exchanger as claimed in claim 24, wherein the tube height b=4.5 mm.

26. The exhaust gas heat exchanger as claimed in claim 24, wherein a ratio of the tube height b to a height h of at least one of the plurality of fins of the ambient air ducts is in a range $0.5 \leq b/h \leq 1.5$.

27. The exhaust gas heat exchanger as claimed in claim 1, wherein the exhaust gas heat exchanger is a component of a cooling module, the cooling module comprising a coolant cooler, a condenser, a charge air cooler, or a combination thereof.

28. The exhaust gas heat exchanger as claimed in claim 27, wherein the exhaust gas heat exchanger and the charge air cooler are arranged one above the other in the cooling module.

29. The exhaust gas heat exchanger as claimed in claim 1, further comprising a bypass configured to be controlled by a differential pressure between an exhaust gas inlet and an exhaust gas outlet on the exhaust gas heat exchanger.

30. The exhaust gas heat exchanger as claimed in claim 29, wherein the bypass comprises a differential pressure valve having an exhaust gas supply duct and an exhaust gas return duct which can be separated and bypassed by a valve closing member.

31. The exhaust gas heat exchanger as claimed in claim 30, wherein the exhaust gas supply duct is connected to the exhaust gas inlet of the exhaust gas heat exchanger, and the exhaust gas return duct is connected to the exhaust gas outlet of the exhaust gas heat exchanger.

32. The exhaust gas heat exchanger as claimed in claim 30, wherein the valve closing member is loaded by a closing spring.

33. The exhaust gas heat exchanger as claimed in claim 1, further comprising an electric heater configured to heat the flat exhaust gas tubes.

34. The exhaust gas heat exchanger as claimed in claim 33, wherein the electric heater comprises heating filaments which are arranged in a heat-conducting fashion on an outside of the flat exhaust gas tubes.

35. The exhaust gas heat exchanger as claimed in claim 1, further comprising a displaceable covering device comprising longitudinal slots.

36. The exhaust gas heat exchanger as claimed in claim 35, wherein the longitudinal slots are arranged parallel to the flat exhaust gas tubes.

37. The exhaust gas heat exchanger as claimed in claim 35, wherein the covering device comprises webs between the longitudinal slots, the webs being configured to selectively cover the fins of the ambient air ducts.

38. The exhaust gas heat exchanger as claimed in claim 35, wherein the covering device is configured to be selectively displaced transversely with respect to the flat exhaust gas tubes.

39. The exhaust gas heat exchanger as claimed in claim 1, wherein the exhaust gas heat exchanger and a charge air cooler are connected to one another to form a heat exchanger module.

40. The exhaust gas heat exchanger as claimed in claim 39, wherein at an outlet side of the flat exhaust gas tubes, the exhaust gas is conducted separately from charge air through or around an outlet-side charge air tank of the charge air cooler.

41. The exhaust gas heat exchanger as claimed in claim 40, wherein the exhaust gas is conducted in a separate duct located upstream of an outlet side collecting tank.

42. The exhaust gas heat exchanger as claimed in claim 41, wherein the separate duct is arranged inside or outside the outlet-side charge air tank.

43. The exhaust gas heat exchanger as claimed in claim 42, wherein the separate duct is formed by a partition in the outlet-side charge air tank.

44. The exhaust gas heat exchanger as claimed in claim 41, wherein the separate duct comprises a tube or hose made from plastic, rubber or steel, or as a plastic blow-molded part.

45. The exhaust gas heat exchanger as claimed in claim 40, further comprising a mixing zone located downstream of the charge air tank and configured to allow the exhaust gas and the charge air to mix within the mixing zone.

46. The exhaust gas heat exchanger as claimed in claim 39, further comprising a venturi nozzle configured to suck the exhaust gas from the exhaust gas heat exchanger.

47. The exhaust gas heat exchanger as claimed in claim 39, wherein the exhaust gas heat exchanger and the charge air cooler are integrated to form a common heat exchanger which can be traversed by a flow of charge air in a first direction and the flow of exhaust gas in the first direction and can be cooled by the flow of ambient air in a second direction.

48. The exhaust gas heat exchanger as claimed in claim 47, wherein the exhaust gas and the charge air are supplied to the common heat exchanger via a common inlet connecting piece or via separate inlet connecting pieces.

49. An arrangement for exhaust gas recirculation (EGR) in a motor vehicle having an internal combustion engine with an intake line, an exhaust gas line, and an EGR line, wherein the arrangement comprises the exhaust gas heat exchanger as claimed in claim 1.

50. The arrangement as claimed in claim 49, wherein an exhaust gas cooler is connected upstream of the exhaust gas heat exchanger in the EGR line, the exhaust gas cooler being configured to be cooled by a liquid coolant.

51. The arrangement as claimed in claim 49, wherein the exhaust gas heat exchanger is not arranged on a cooling module.

52. The arrangement as claimed in claim 49, wherein a separate fan for feeding cooling air is connected upstream or downstream of the exhaust gas heat exchanger.

53. The exhaust gas heat exchanger as claimed in claim 1, wherein an oxidation catalytic converter is connected upstream of the exhaust gas heat exchanger.

54. The exhaust gas heat exchanger as claimed in claim 53, wherein the oxidation catalytic converter is arranged inside or outside an inlet-side collecting tank for the exhaust gas.

55. An air-cooled exhaust gas heat exchanger for a motor vehicle, the exhaust gas heat exchanger comprising:
a plurality of flat exhaust gas tubes configured to allow a flow of exhaust gas therethrough;
a plurality of ambient air ducts arranged between the flat exhaust gas tubes and configured to allow a flow of ambient air therethrough; and
first and second exhaust gas collecting tanks that receive open ends of the flat exhaust gas tubes, the first and second exhaust gas collecting tanks being configured to allow the flow of exhaust gas from the first exhaust gas collecting tank to the second exhaust gas collecting tank through the plurality of flat exhaust gas tubes;

wherein each of the ambient air ducts comprises a plurality of fins, wherein the plurality of flat exhaust gas tubes and the plurality of fins of the ambient air ducts form a fin/tube block, wherein each of the first and second exhaust gas collecting tanks comprises a flat tube plate with openings into which ends of the flat exhaust gas tubes are welded or soldered, edges of each of the openings being entirely surrounded by flat surfaces forming portions of the flat tube plate, and wherein the exhaust gas heat exchanger further comprises at least one coolant duct arranged upstream of the plurality of flat exhaust gas tubes in a direction of the flow of ambient air.

56. The exhaust gas heat exchanger as claimed in claim 55, wherein the at least one coolant duct has a serpentine shape and comprises straight duct sections which are arranged parallel to the flat exhaust gas tubes.

57. The exhaust gas heat exchanger as claimed in claim 55, wherein the coolant duct is connected to a cooling circuit of an internal combustion engine.

\* \* \* \* \*